United States Patent
Couillard

(10) Patent No.: US 7,162,783 B2
(45) Date of Patent: Jan. 16, 2007

(54) FORMING ELEMENTS FROM CONCRETE PIPE

(76) Inventor: Harland D. Couillard, 7791 Lake Bluff 19.4 Rd., Gladstone, MI (US) 49837

(*) Notice: Subject to any disclaimer, the term of this patent is extended or adjusted under 35 U.S.C. 154(b) by 0 days.

(21) Appl. No.: 10/822,588

(22) Filed: Apr. 12, 2004

(65) Prior Publication Data

US 2004/0187436 A1 Sep. 30, 2004

Related U.S. Application Data

(62) Division of application No. 10/084,096, filed on Feb. 27, 2002, now Pat. No. 6,748,636.

(51) Int. Cl.
*B23P 19/04* (2006.01)

(52) U.S. Cl. ............................. 29/239; 29/238; 29/237; 264/69; 52/720.1

(58) Field of Classification Search ................ 254/1, 254/106, 133, DIG. 4, 30, 29 R, 131; 29/234, 29/252, 253, 243.55, 238, 239, 278, 237, 29/261, 259; 52/720.1, 125.2, 125.6; 264/334, 264/69; 425/438
See application file for complete search history.

(56) References Cited

U.S. PATENT DOCUMENTS

| | | | |
|---|---|---|---|
| 135,880 A * | 2/1873 | Beckmann et al. ......... 29/34 B |
| 1,921,503 A | 8/1933 | Calderwood | |
| 2,554,453 A * | 5/1951 | Lloyd ......................... 425/116 |
| 3,169,010 A | 2/1965 | Crawford, Jr. | |
| 3,368,270 A * | 2/1968 | Babian ........................ 29/237 |
| 3,586,112 A | 6/1971 | Kelley | |
| 3,718,309 A * | 2/1973 | Harris .......................... 249/90 |
| 3,768,954 A * | 10/1973 | Marsh et al. ................ 425/451 |
| 3,815,202 A * | 6/1974 | Squires ........................ 29/252 |
| 3,903,971 A | 9/1975 | Watanabe | |
| 4,157,810 A * | 6/1979 | Haller et al. ................ 254/131 |
| 4,253,353 A * | 3/1981 | Symbol ..................... 81/124.7 |
| 4,283,827 A | 8/1981 | Abel | |
| 4,365,786 A * | 12/1982 | Osteen ........................ 254/30 |
| 4,400,108 A * | 8/1983 | Freeman ..................... 405/155 |
| 4,535,822 A * | 8/1985 | Rogers, Jr. .................. 138/99 |
| 4,756,861 A * | 7/1988 | Schultz ........................ 264/71 |
| 4,871,034 A * | 10/1989 | Schmidt ...................... 173/90 |
| 4,893,393 A * | 1/1990 | Marshall ...................... 29/237 |
| 5,075,946 A * | 12/1991 | Yeargin ........................ 29/237 |
| 5,129,136 A * | 7/1992 | Richardson ................ 29/426.5 |
| 5,283,936 A * | 2/1994 | Pickles et al. ................ 29/268 |
| 5,329,685 A * | 7/1994 | Gillespie ...................... 29/254 |
| 5,379,986 A | 1/1995 | Perez et al. | |
| 5,647,112 A * | 7/1997 | Arvizu ......................... 29/268 |
| 5,720,993 A * | 2/1998 | Schmidgall ................. 425/441 |
| 5,775,674 A * | 7/1998 | Bigham ...................... 254/131 |
| 6,209,182 B1 * | 4/2001 | Frohlich ....................... 29/239 |
| 6,748,636 B1 * | 6/2004 | Couillard ..................... 29/239 |

\* cited by examiner

*Primary Examiner*—Basil Katcheves
(74) *Attorney, Agent, or Firm*—Brooks Kushman P.C.

(57) ABSTRACT

An apparatus for removing a forming element from a concrete pipe includes a support member and a removal device including first and second elements. The first element is attachable to the forming element and has a stop. The second element is supported by the support member such that the second element is swingable with respect to the support member. In addition, the second element is engageable with the stop so as to apply a force to the first element for removing the forming element from the concrete pipe.

23 Claims, 4 Drawing Sheets

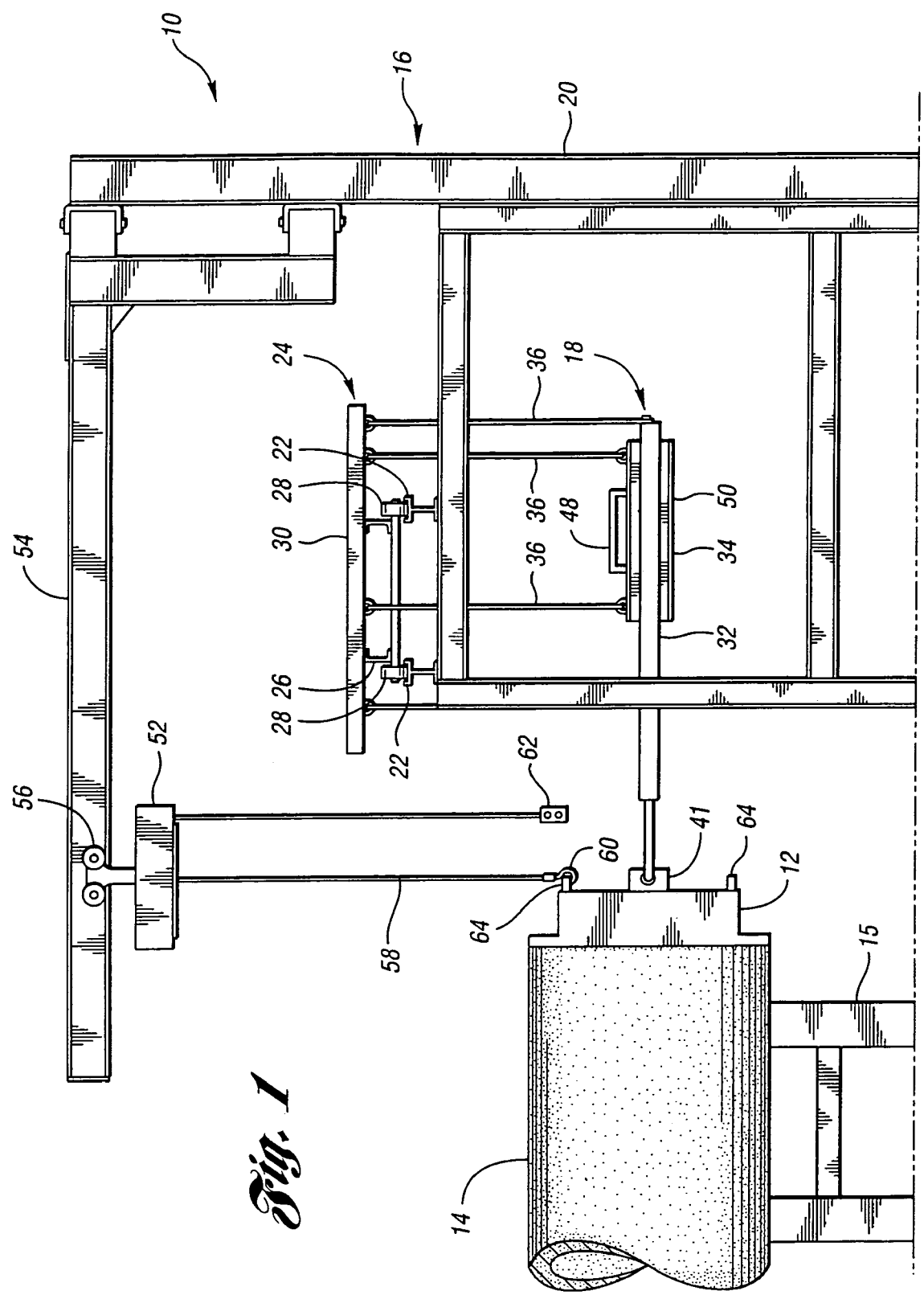

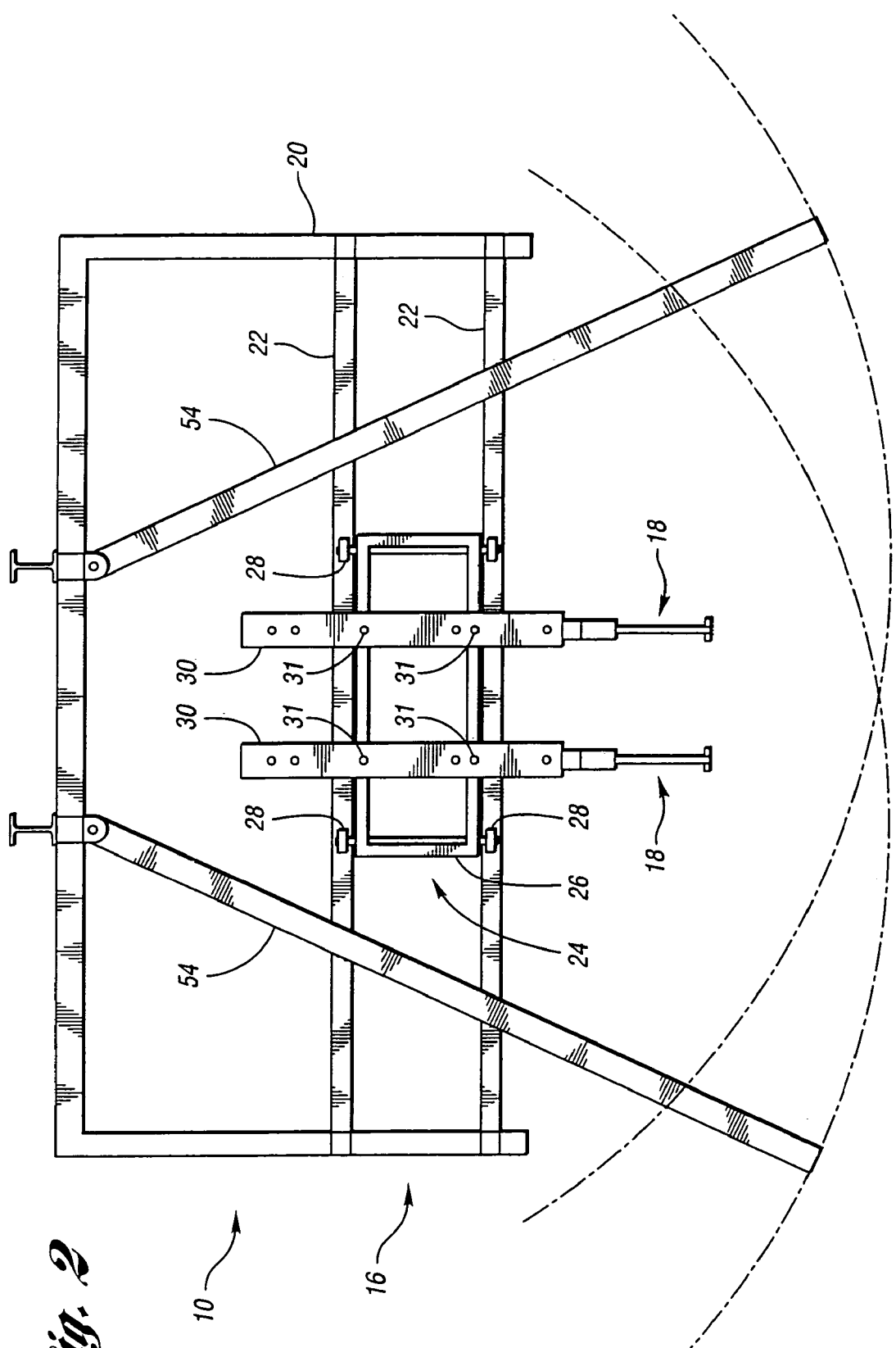

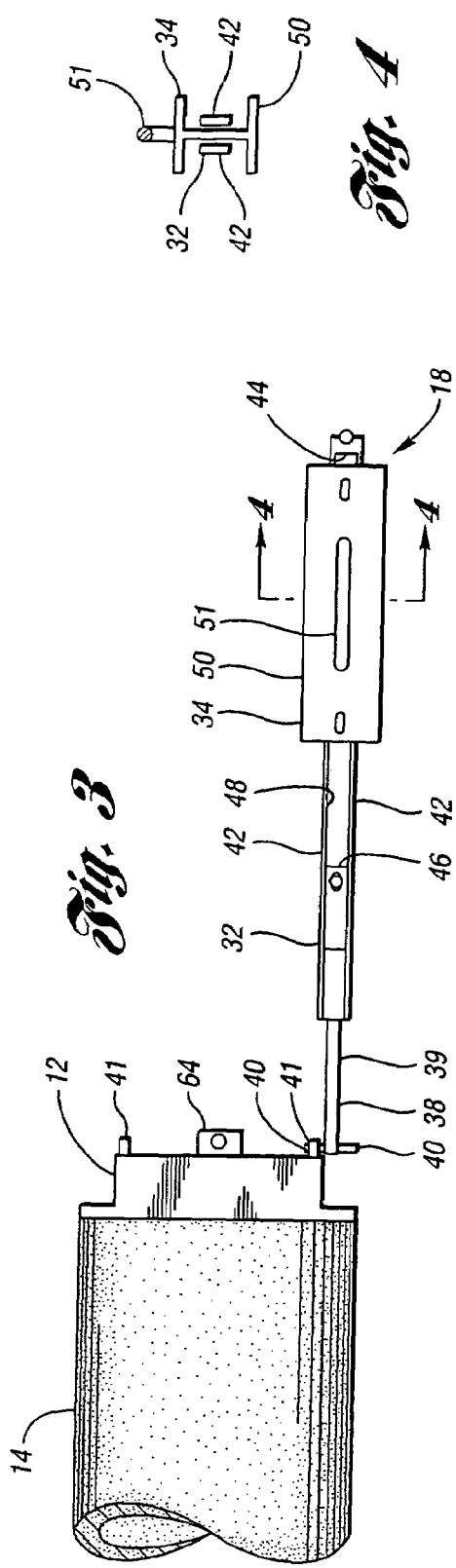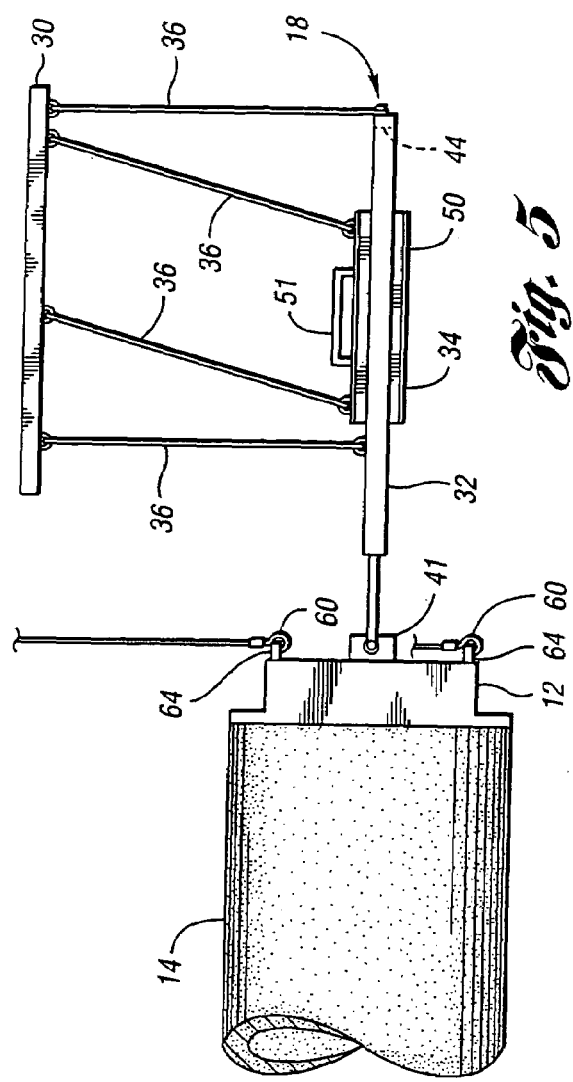

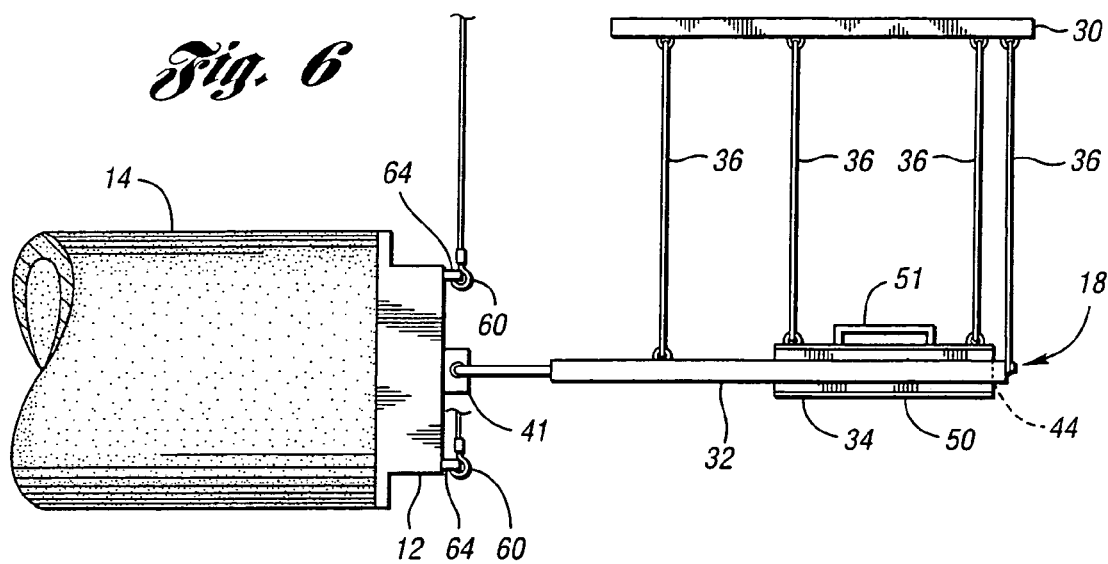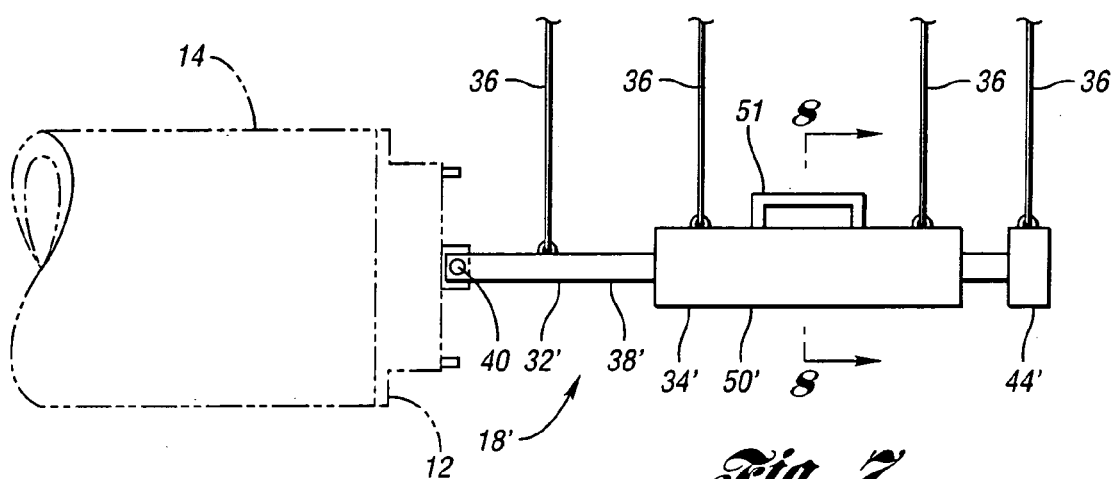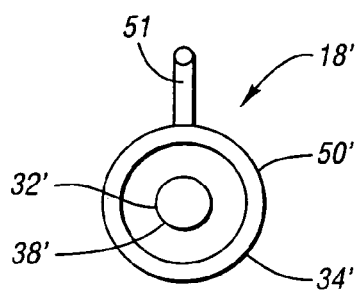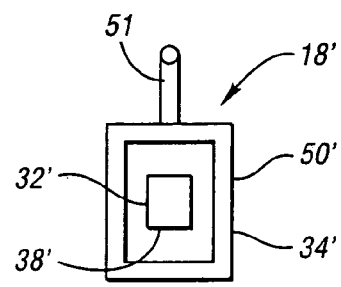

FORMING ELEMENTS FROM CONCRETE PIPE

"This is a divisional of application(s) Ser. No. 10/084,096 filed on Feb. 27, 2002."now U.S. Pat. No. 6,748,636.

BACKGROUND OF THE INVENTION

1. Field of the Invention

The invention relates to a method and apparatus for removing a forming element from concrete pipe.

2. Background Art

Hand held hammers have been used to remove forming elements, such as headers and pallets, from concrete pipe. Such hammers are used to strike forming elements so as to break them free from concrete pipe. While effective, these hammers are relatively inefficient and difficult to handle.

Pneumatic hammers have also been used for the same purpose. One known pneumatic hammer includes a rod that is attachable to a forming element, and a weight that is axially movable along the rod. The weight is air-driven against an end of the rod so as to apply a removing force on the forming element. The hammer may further be supported by a hoist. Such a hammer, however, is expensive and requires an air compressor to operate.

SUMMARY OF THE INVENTION

Under the invention, an apparatus for removing a forming element from a concrete pipe includes a support member and a removal device including first and second elements. The first element is attachable to the forming element and has a stop. The second element is supported by the support member such that the second element is swingable with respect to the support member. In addition, the second element is engageable with the stop so as to apply a force to the first element for removing the forming element from the concrete pipe.

Further under the invention, a method of removing a forming element from a concrete pipe includes attaching a guide element to the forming element, the guide element having a stop; and swinging a pendulum element such that the pendulum element engages the stop and applies a force on the guide element, thereby causing the guide element to apply a removing force on the forming element.

Generally, under the invention, an apparatus for separating a first object from a second object includes a support member and a removal device including first and second elements. The first element is attachable to the first object and has a stop. The second element is supported by the support member such that the second element is swingable with respect to the support member. In addition, the second element is engageable with the stop so as to apply a force to the first element for separating the first object from the second object.

BRIEF DESCRIPTION OF THE DRAWINGS

FIG. 1 is a side view of an apparatus according to the invention for removing a forming element from a concrete pipe;

FIG. 2 is a plan view of the apparatus showing two hammer devices;

FIG. 3 is a top view of one of the hammer devices;

FIG. 4 is a vertical cross sectional view of one of the hammer devices taken along line 4—4 of FIG. 3 and viewed in the direction of the airrows;

FIG. 5 is a side view of one of the hammer devices supported by a suspension beam and including a guide element and a pendulum element that is movable with respect to the guide element, wherein the pendulum element is shown in a first position;

FIG. 6 is a side view of the hammer device of FIG. 5 showing the pendulum element in a second position engaged with a stop of the guide element.

FIG. 7 is a side view of a second embodiment of a hammer device according to the invention;

FIG. 8 is a cross-sectional view of the hammer device of FIG. 7 taken along line 8—8 and viewed in the direction of the arrows; and FIG. 9 is a cross-sectional view similar to FIG. 8 showing an alternative configuration of the hammer device of FIG. 7.

DETAILED DESCRIPTION OF THE PREFERRED EMBODIMENT(S)

FIGS. 1 and 2 show an apparatus 10 according to the invention for removing a forming element 12 from a concrete pipe 14, which may be supported on a stand 15. The forming element 12 may be, for example, a header or a pallet. A header is a cast iron ring, or other suitable structure, that is used to form a male end of the concrete pipe 14, and a pallet is a cast iron ring, or other suitable structure, that is used to form a female end of the concrete pipe 14. The concrete pipe 14 may be of the type used in water supply systems, storm sewer systems, sewage systems, and/or other fluid carrying systems, for example.

The apparatus 10 includes a support member, such as support arrangement 16, and one or more removal devices, such as hammer devices 18, supported by the support arrangement 16. While the support arrangement 16 may have any suitable configuration, in the embodiment shown in FIGS. 1 and 2, the support arrangement 16 includes a main support structure or support frame 20 having laterally extending tracks 22. The support arrangement 16 further includes a carriage, such as trolley 24, that is supported on the tracks 22 and is laterally movable with respect to the support frame 20. The trolley 24 includes a base 26 having multiple wheels 28 that are engageable with the tracks 22, and one or more support beams 30 connected to the base 26. In one embodiment of the invention, the support beams 30 may be laterally adjusted with respect to the base 26, and then secured in a desired position with removable fasteners, such as pins, bolts, and/or screws 31, that are configured to extend into one or more apertures formed in the base 26.

Each hammer device 18 includes first and second elements, such as a guide element 32 and a drive element or pendulum element 34, that are supported by a respective support beam 30. For example, the guide element 32 and pendulum element 34 of a particular hammer device 18 may be connected to a respective support beam 30 by suspension members 36, such as cables or chains.

Referring to FIGS. 3 and 4, each guide element 32 has an attachment portion, such as a rod 38, that is attachable to the forming element 12. For example, the rod 38 may include a rod body 39 and one or more laterally extending projections 40 that are each insertable into an eyelet 41, or other attachment feature, on the forming element 12. Each guide element 32 further includes two longitudinally extending side portions or rails 42 connected to a respective rod 38. The rails 42 of a respective guide element 32 are connected together at one end by a stop 44, and are further connected together proximate an opposite end by a laterally extending member 46. For each guide element 32, the rails 42 define a guide channel 48 for receiving a respective pendulum element 34 and for guiding movement of the pendulum element 34. Alternatively, each guide element 32 may have any suitable configuration sufficient to guide movement of a respective pendulum element 34.

Each pendulum element 34 is supported by a respective support beam 30 such that the pendulum element 34 is swingable with respect to the support beam 30. While each pendulum element 34 may have any suitable configuration, in the embodiment shown in the figures, each pendulum element 34 includes a pendulum body 50, such as an I-beam having an I-shaped cross section, and a handle 51 attached to the pendulum body 50. Such a configuration allows each pendulum element 34 to move vertically, as well as horizontally, with respect to a respective guide element 32. Each pendulum element 34 is movable along at least a portion of a respective guide element 32 between a first position shown in FIG. 5, and a second position shown in FIG. 6 in which the pendulum element 34 is engaged with the stop 44 of a respective guide element 32. Thus, each pendulum element 34 may be swung against a stop 44 of a respective guide element 32 so as to impart a force on or to the guide element 32, thereby causing the guide element 32 to apply a removal force on or to the forming element 12.

In the embodiment shown in the Figures, the pendulum element 34 remains substantially parallel to the support beam 30, as well as to a floor surface on which the apparatus 10 is disposed, as the pendulum element 34 swings between the first and second positions. In other words, the pendulum element 34 remains oriented generally horizontally as the pendulum element 34 swings between the first and second positions. With such a configuration, the pendulum element 34 strikes the stop 44 squarely when the pendulum element 34 is in the second position.

Alternatively, the hammer devices 18 may have any suitable configuration such that each pendulum element 34 may move vertically and horizontally with respect to a respective guide element 32, thereby allowing pendulum movement of the pendulum elements 34 with respect to the guide elements 32. Examples of other suitable configurations are described below in detail.

In addition, the hammer devices 18 may comprise any suitable material and be manufactured in any suitable manner. For example, each guide element 32 and each pendulum element 34 may comprise steel or aluminum. Furthermore, the hammer devices 18 may be assembled in any suitable manner. For example, each pendulum element 34 may be positioned in the guide channel 48 of a respective guide element 32, and then the laterally extending member 46 and rod 38 may be welded, or otherwise attached, to the rails 42 of the guide element 32.

Returning to FIG. 1, the apparatus 10 may also include one or more hoists 52 that are also supported by the support arrangement 16. For example, the support arrangement 16 may include one or more support arms 54 pivotably attached to the support frame 20, and configured to support the hoists 52. Each hoist 52 may also be laterally movable with respect to a respective support arm 54 so that the hoist 52 may be properly positioned with respect to the forming element 12. For example, each hoist 52 may include one or more wheels 56 that are engageable with a respective support arm 54.

Each hoist 52 includes a hoist member, such as a cable 58, having any suitable attachment element, such as a hook 60, that is attachable to the forming element 12 so that the hoist 52 may be used to support the forming element 12 after the forming element 12 has been removed from the concrete pipe 14. Each hoist 52 may further include electronic controls 62 for controlling movement of the cable 58.

Referring to FIGS. 1–6, operation of the apparatus 10 will now be described in detail. First, the hammer devices 18 may be moved into proper position with respect to the concrete pipe 14 by moving the trolley 24 with respect to the support frame 20. Advantageously, the support beams 30 may also be laterally adjusted with respect to the base 26 of the trolley 24 so as to accommodate different forming element and/or concrete pipe diameters. Furthermore, the height of the hammer devices 18 may be adjusted for the same reason. For example, if the suspension members 36 are chains, one or more chain links may be removed to adjust the length of each suspension member 36. Alternatively, changes in spacing of the hammer devices 18 and/or height of the hammer devices 18 may be accomplished automatically with, for example, electronic, pneumatic and/or hydraulic controls.

Next, each hammer device 18 may be attached to the forming element 12, such as by inserting a respective projection 40 into an eyelet 41. The hoists 52 may be moved into proper position by pivoting the support arms 54 and/or by moving the hoists 52 with respect to the support arms 54. Next, each hoist 52 may be attached to the forming element 12 such as by inserting a respective hook 60 into an attachment feature, such as an eyelet 64, on the forming element 12. The hoists 52 may then be adjusted so that the cables 58 are sufficiently taut.

Next, referring to FIG. 5, one or both of the pendulum elements 34 may be moved manually to respective first positions using, for example, the handles 51. The pendulum elements 34 may then be released from the first positions so that each pendulum element 34 swings toward a respective second position and engages a respective stop 44, thereby imparting a force on or to the corresponding guide element 32 in a direction generally away from the forming element 12. As a result, each guide element 32 applies a removing force on or to the forming element 12 in order to break the bond between the forming element 12 and the concrete pipe 14. If the forming element 12 remains attached to the concrete pipe 14, one or both of the pendulum elements 34 may be swung one or more additional times against the stops 44.

After the forming element 12 has been removed from the concrete pipe 14, one or both of the hoists 52 may be used to support the forming element 12. The hammer devices 18 may then be removed from the forming element 12. Next, the support arms 54 may be pivoted to a side of the concrete pipe 14 so as to position the forming element 12 on a cleaning table (not shown). After sufficient cleaning, the support arms 54 may again be pivoted with respect to the support frame 20, such as by pushing or pulling on the forming element 12, so as to position the forming element 12 on a storage pallet (not shown) or at some other suitable location.

Although the apparatus 10 is shown with two hammer devices 18, the apparatus 10 may include one or more hammer devices 18 as previously mentioned. Furthermore, if the apparatus 10 is provided with multiple hammer devices 18, the hammer devices 18 may be swung simultaneously or one at a time. Additionally, as mentioned above, the apparatus 10 may be provided with a single hoist 52 for supporting the forming element 12.

The apparatus 10 includes several beneficial aspects. First, if the apparatus 10 is provided with the trolley 24, the hammer devices 18 may be easily and efficiently positioned with respect to the forming element 12. Second, the hammer devices 18 may be manually operated. Third, the hammer devices 18 utilize the force of gravity to generate removing forces that are applied to the forming element 12. Fourth, the removing force generated by each hammer device 18 may be easily adjusted by varying swing speed and/or by varying swing weight of the pendulum element 34. For example, each pendulum 34 may include a post, or other suitable feature, on which weights may be mounted. As another example, one or more members such as weights may bolted, welded or otherwise attached to each pendulum element 34. Furthermore, if the apparatus 10 includes one or more hoists 52, the hoists 52 may be used to efficiently handle and position the forming element 12 after removal from the concrete pipe 14.

FIG. 7 shows a second embodiment 18' of a hammer device according to the invention. The hammer device 18' may be supported by any suitable support member, such as the support arrangement 16 described above, and may be operated in a similar manner as the hammer device 18. Furthermore, similar features of the hammer device 18 and hammer device 18' are identified with the same reference numbers.

The hammer device 18' includes a guide element 32' and a pendulum element 34' that is swingably movable along at least a portion of the guide element 32'. The guide element is formed as an elongated rod 38' with an enlarged end that defines a stop 44'. The pendulum element 34' has a hollow body 50' that receives the guide element 32'. Furthermore, the hollow body 50' is engageable with the stop 44' so as to apply a hammer force on or to the stop 44', thereby causing the guide element 32' to apply a removing force on or to the forming element 12.

The rod 38' and hollow body 50' may have any suitable configuration such that the pendulum element 34' may move vertically and horizontally with respect to the guide element 32', thereby allowing pendulum or swinging movement of the pendulum element 34' with respect to the guide element 32'. For example, referring to FIG. 8, the rod 38' may have a generally circular cross-section, and the hollow body 50' may be a generally cylindrical or tubular member. As another example, the rod 38' and hollow body 50' may each have a generally rectangular cross-section, as shown in FIG. 9. In either case, the hollow body 50' has an inner dimension, such as an inner diameter, that is sufficiently large to allow the pendulum element 34' to swing along the guide element 32'.

While the apparatus 10 is particularly useful for removing forming elements from concrete pipe, the apparatus 10 may be used in any application that requires a relatively high impact force. For example, the apparatus 10 may be used in any application requiring a relatively large force for separating joined objects or members. For instance, the apparatus 10 may be used to pull an axle from an axle housing.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of removing a forming element from a concrete pipe, the method comprising:
    attaching a guide element to the forming element, the guide element having a stop; and
    swinging a pendulum element such that the pendulum element engages the stop and applies a force on the guide element, thereby causing the guide element to apply a removing force on the forming element.

2. The method of claim 1 wherein the guide element has a guide channel that receives at least a portion of the pendulum element as the pendulum element swings.

3. The method of claim 1 wherein the pendulum element has an I-shaped cross-section.

4. The method of claim 1 wherein the pendulum element includes a cylindrical body, and the guide element extends through the cylindrical body.

5. The method of claim 1 wherein the guide element and the pendulum element each have a generally rectangular cross-section, and the guide element extends through the pendulum element.

6. The method of claim 1 wherein the pendulum element is supported by a support member such that the pendulum element is swingable with respect to the support member.

7. The method of claim 6 wherein the guide element is also supported by the support member.

8. The method of claim 7 wherein the guide element is supported by the support member independently of the pendulum element.

9. The method of claim 6 wherein the pendulum element is configured to remain oriented generally horizontally as the pendulum element swings with respect to the support member.

10. The method of claim 6 wherein the pendulum element is swingable with respect to the support member between a first position in which the pendulum element is disengaged from the stop and a second position in which the pendulum element is engaged with the stop.

11. The method of claim 1 further comprising adjusting swing weight of the pendulum element.

12. A method for separating a first object from a second object, the method comprising:
    engaging a first element with the first object, the first element having a stop; and
    swinging an inanimate second element with respect to a support member and between the first object and the stop such that the second element engages the stop and applies a force on the first element for separating the first object from the second object;
    wherein the second element is swingable with respect to the support member between a first position in which the second element is disengaged from the stop and a second position in which the second element is engaged with the stop, and wherein the second element applies a generally horizontal force to the first element upon engaging the stop.

13. The method of claim 12 wherein the first element has a guide channel that receives at least a portion of the second element as the second element swings.

14. The method of claim 12 wherein the second element has an I-shaped cross-section.

15. The method of claim 12 wherein the first and second elements are supported by the support member.

16. The method of claim 12 further comprising adjusting swing weight of the second element.

17. The method of claim 12 wherein the second element is swingable with respect to the support member between a first position in which the second element is disengaged from the stop and a second position in which the second element is engaged with the stop.

18. The method of claim 12 wherein the second element remains oriented generally horizontally as the second element swings with respect to the support member.

19. The method of claim 12 wherein the generally horizontal force is applied substantially parallel to a floor surface above which the second element is supported.

20. A method for separating a first object from a second object, the method comprising:
    engaging a first element with the first object, the first element having a stop; and
    swinging a second element with respect to a support member such that the second element engages the stop and applies a force on the first element for separating the first object from the second object;
    wherein the second element is swingable with respect to the support member between a first position in which the second element is disengaged from the stop and a second position in which the second element is engaged with the stop, and wherein the second element includes a cylindrical body, and the first element extends through the cylindrical body.

21. A method for separating a first object from a second object, the method comprising:
    engaging a first element with the first object, the first element having a stop; and
    swinging a second element with respect to a support member such that the second element engages the stop and applies a force on the first element for separating the first object from the second object;
    wherein the second element is swingable with respect to the support member between a first position in which the second element is disengaged from the stop and a second position in which the second element is engaged with the stop, and wherein the first element and the second element each have a generally rectangular cross-section, and the first element extends through the second element.

22. A method for separating a first object from a second object, the method comprising:
    engaging a first element with the first object, the first element having a stop; and
    swinging an inanimate second element with respect to a support member and between the first object and the stop such that the second element engages the stop and applies a force on the first element for separating the first object from the second object;
    wherein the second element is swingable with respect to the support member between a first position in which the second element is disengaged from the stop and a second position in which the second element is engaged with the stop, and wherein the first and second elements are supported by the support member and the first element is supported by the support member independently of the second element.

23. A method for separating a first object from a second object, the method comprising:
    engaging a first element with the first object, the first element having a stop; and
    swinging an inanimate second element with respect to a support member and between the first object and the stop such that the second element engages the stop and applies a force on the first element for separating the first object from the second object, wherein the second element remains oriented generally horizontally as the second element swings with respect to the support member.

* * * * *

UNITED STATES PATENT AND TRADEMARK OFFICE
CERTIFICATE OF CORRECTION

PATENT NO.        : 7,162,783 B2
APPLICATION NO.   : 10/822588
DATED             : January 16, 2007
INVENTOR(S)       : Harland D. Couillard Page 1 of 1

It is certified that error appears in the above-identified patent and that said Letters Patent is hereby corrected as shown below:

Column 6, line 35, Claim 12:    After "swinging" insert --a--, and delete "an inanimate", and after "to" delete "a" and insert --an inanimate-- therefor.

Column 8, line 6, Claim 22:     After "swinging" insert --a--, and delete "an inanimate", and after "to" delete "a" and insert --an inanimate-- therefor.

Column 8, line 24, Claim 23:    After "swinging" insert --a--, and delete "an inanimate", and after "to" delete "a" and insert --an inanimate-- therefor.

Signed and Sealed this

Twenty-fifth Day of November, 2008

JON W. DUDAS
*Director of the United States Patent and Trademark Office*